United States Patent
Wikander (10) Patent No.: US 9,111,274 B2
(45) Date of Patent: Aug. 18, 2015

(54) PAYMENT PROCESSING

(75) Inventor: Anders Wikander, Oxie (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 26 days.

(21) Appl. No.: 13/504,648

(22) PCT Filed: Apr. 28, 2011

(86) PCT No.: PCT/IB2011/051891
§ 371 (c)(1),
(2), (4) Date: Apr. 27, 2012

(87) PCT Pub. No.: WO2012/146951
PCT Pub. Date: Nov. 1, 2012

(65) Prior Publication Data
US 2012/0276845 A1    Nov. 1, 2012

(51) Int. Cl.
*G06Q 30/00* (2012.01)
*G06Q 20/32* (2012.01)
*G06Q 20/12* (2012.01)
*G06Q 20/20* (2012.01)
*G07F 17/24* (2006.01)

(52) U.S. Cl.
CPC .......... *G06Q 20/3255* (2013.01); *G06Q 20/127* (2013.01); *G06Q 20/20* (2013.01); *G06Q 20/32* (2013.01); *G06Q 20/3278* (2013.01); *G07F 17/24* (2013.01)

(58) Field of Classification Search
CPC .......................... H04W 4/008; G06Q 20/3278
USPC ........ 455/41.1–41.3, 466; 235/382, 384, 375; 340/9.1, 541, 932.2; 705/13, 67, 26, 705/44; 709/218
See application file for complete search history.

(56) References Cited

U.S. PATENT DOCUMENTS

| 6,116,505 A | 9/2000 | Withrow |
| 2003/0078843 A1* | 4/2003 | Sone .............................. 705/16 |

(Continued)

FOREIGN PATENT DOCUMENTS

| EP | 1 333 409 A2 | 8/2003 |
| JP | 2008-186183 | 8/2008 |

OTHER PUBLICATIONS

International Preliminary Report on Patentability dated Nov. 7, 2013 issued in the corresponding PCT application No. PCT/IB2011/051891, 5 pages.

(Continued)

*Primary Examiner* — Andrew Wendell
*Assistant Examiner* — Cindy Trandai
(74) *Attorney, Agent, or Firm* — Snyder, Clark, Lesch & Chung, LLP (57) ABSTRACT

A system may include a communication interface configured to communicate with a mobile device and processing logic. The processing logic may be configured to receive authorization from the mobile device, when the mobile device is located proximate to the system, for a first payment for a good or service, and transmit a communication to the mobile device subsequent to receiving the authorization from the mobile device, where the communication is transmitted when the mobile device is not located proximate to the system. The processing logic may further be configured to receive authorization from the mobile device for a second payment in response to the communication.

16 Claims, 5 Drawing Sheets

(56) References Cited

U.S. PATENT DOCUMENTS

| | | |
|---|---|---|
| 2004/0012481 A1 | 1/2004 | Brusseaux |
| 2004/0030601 A1* | 2/2004 | Pond et al. .................... 705/16 |
| 2004/0094619 A1* | 5/2004 | Silberberg .................. 235/382 |
| 2005/0027608 A1* | 2/2005 | Wiesmuller et al. ........... 705/26 |
| 2007/0016539 A1* | 1/2007 | Groft et al. .................. 705/418 |
| 2007/0180057 A1* | 8/2007 | McEnroe ..................... 709/218 |
| 2007/0299681 A1* | 12/2007 | Plastina et al. .................... 705/1 |
| 2008/0120199 A1* | 5/2008 | Pirnack et al. ................. 705/27 |
| 2009/0144203 A1* | 6/2009 | Hurry ............................ 705/67 |
| 2010/0114686 A1* | 5/2010 | Carlson et al. ............. 705/14.17 |
| 2010/0280956 A1* | 11/2010 | Chutorash et al. ............. 705/64 |
| 2011/0057815 A1* | 3/2011 | King et al. ................. 340/932.2 |
| 2012/0130872 A1* | 5/2012 | Baughman et al. ............. 705/32 |

OTHER PUBLICATIONS

International Search Report and Written Opinion dated Feb. 24, 2012 issued in corresponding PCT application No. PCT/IB2011/051891, 9 pages.

* cited by examiner

FIG. 5

PAYMENT PROCESSING

TECHNICAL FIELD OF THE INVENTION

The invention relates generally to payment processing and, more particularly, to providing a message reminder to prompt a user for an additional or follow up payment.

DESCRIPTION OF RELATED ART

Paying for various goods or services is often accomplished through electronic means. For example, payments may be made over the telephone or via computer by providing an appropriate credit card or debit card number to a retailer or merchant. The use of such electronic payments has made it easier for consumers to purchase goods and services.

SUMMARY

According to one aspect, a method is provided. The method includes establishing a communication link between a transaction device and a mobile device located proximate to the transaction device, wherein the transaction device is associated with an entity providing a good or service. The method also includes receiving, by the transaction device, authorization from the mobile device for a first payment for the good or service; and transmitting, by the transaction device, a communication to the mobile device subsequent to receiving the authorization from the mobile device, wherein when the communication is transmitted, the mobile device is not located proximate to the transaction device. The method further includes receiving, by the transaction device, authorization from the mobile device for a second payment in response to the communication.

Additionally, the establishing a link may comprise establishing a near field communication link.

Additionally, the transmitting a communication may comprise transmitting a text-based message to the mobile device.

Additionally, the text based message may comprise at least one of a short message service message or an electronic mail message.

Additionally, the transmitting a communication may comprise transmitting an audio message to the mobile device.

Additionally, the method may further comprise determining, by the transaction device, whether the first payment is associated with an expiration time; and generating the communication, in response to determining that the first payment is associated with an expiration time. The transmitting the communication may also comprise transmitting the generated communication prior to the expiration time.

Additionally, the method may further comprise identifying, by the transaction device, a second good or service, and the transmitting may comprise transmitting the communication to the mobile device at a predetermined time after receiving authorization for the first payment, in response to identifying the second good or service.

Additionally, the predetermined time may comprise at least an amount of time associated with a duration of viewing or playing the good or service associated with the first payment.

Additionally, the method may further comprise identifying, by the transaction device, a telephone number or electronic mail address associated with the mobile device, and the transmitting may comprise transmitting the communication to the identified telephone number or electronic mail address.

Additionally, the mobile device may comprise a cellular telephone.

According to another aspect, a system is provided. The system comprises a communication interface configured to communicate with a mobile device, and processing logic. The processing logic is configured to receive authorization from the mobile device, when the mobile device is located proximate to the system, for a first payment for a good or service, and transmit a communication to the mobile device subsequent to receiving the authorization from the mobile device, wherein when the communication is transmitted, the mobile device is not located proximate to the system. The communication logic is further configured to receive authorization from the mobile device for a second payment in response to the communication.

Additionally, the communication interface may comprises a near field communication interface.

Additionally, the processing logic may be further configured to generate a text-based communication based on at least one the good or service, or a time associated with the good or service, and when transmitting a communication, the processing logic may be configured to transmit the text-based message to the mobile device.

Additionally, the text based message may comprise at least one of a short message service message or an electronic mail message.

Additionally, when transmitting a communication, the processing logic may be configured to transmit an audio message to the mobile device.

Additionally, the processing logic may be further configured to generate the communication in response to determining that the first payment is associated with an expiration time, and when transmitting the communication, the processing logic may be configured to transmit the generated communication prior to the expiration time.

Additionally, the processing logic may be further configured to identify a second good or service associated with the good or service for which the first payment was authorized, and when transmitting, the processing logic may be configured to transmit the communication to the mobile device at a predetermined time after receiving authorization for the first payment, wherein the communication identifies the second good or service.

Additionally, the processing logic may be further configured to automatically identify a telephone number or electronic mail address associated with the mobile device, when the mobile device is located proximate to the system, and when transmitting, the processing logic may be configured to transmit the communication to the identified telephone number or electronic mail address.

Additionally, the system may further comprise a memory configured to store billing information associated with an account of a user of the mobile device, and the processing logic may be further configured to use the billing information to determine whether to provide the good or service.

According to a further aspect, a computer-readable memory device having stored thereon sequences of instructions is provided. The instructions, when executed by at least one processor, cause the at least one processor to communicate with a mobile device located proximate to a system associated with providing a good or service, and receive authorization from the mobile device for purchasing or receiving the good or service. The instructions also cause the processor to transmit a communication to the mobile device subsequent to receiving the authorization from the mobile device, the communication being transmitted when the mobile device is not located proximate to the system; and receive authorization from the mobile device for a payment in response to the communication.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
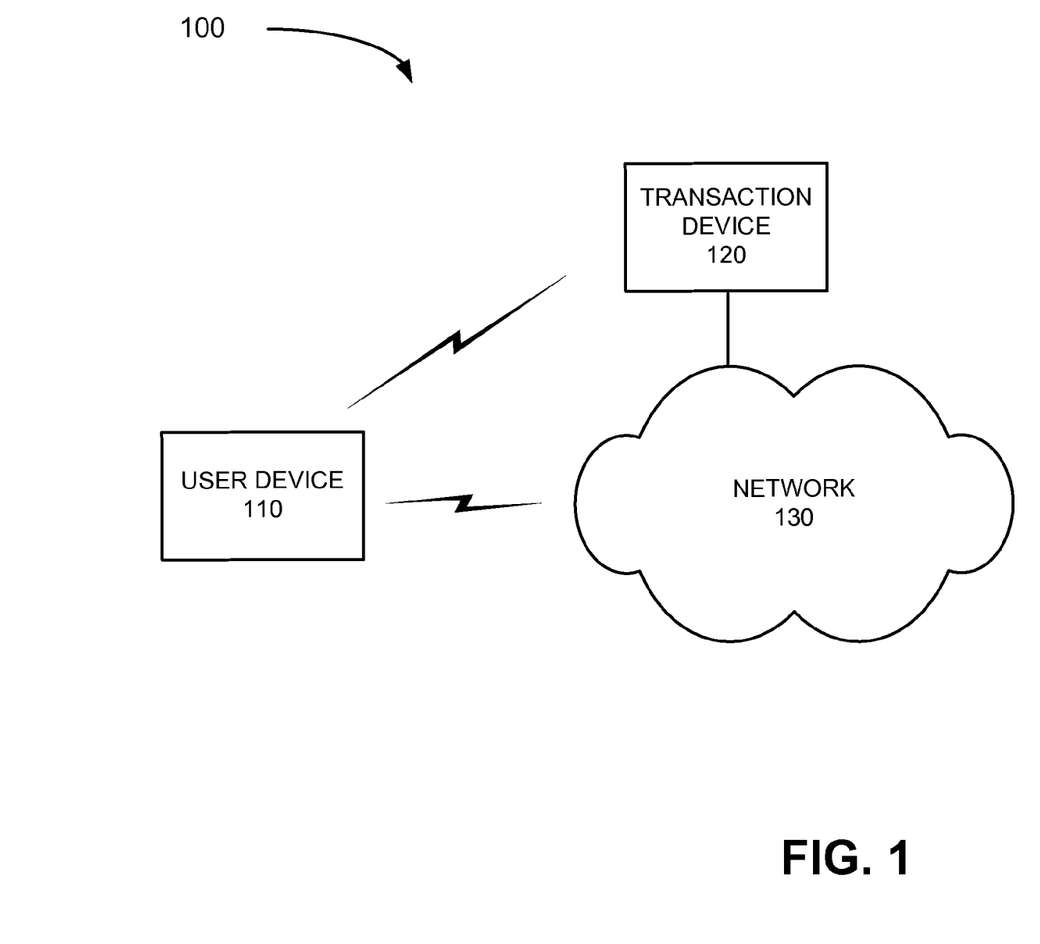
FIG. 1 illustrates an exemplary network in which systems and methods described herein may be implemented.

FIG. 1 is a block diagram of an exemplary network 100 in which systems and methods described herein may be implemented. Network 100 may include user device 110, transaction device 120 and network 130.

User device 110 may represent a device associated with a party who wishes to participate in a transaction, such as make a purchase from a retailer or vendor. For example, user device 110 may include a mobile device or terminal, such as wireless or cellular telephone device (e.g., a conventional cell phone with data processing capabilities), a smart phone, a personal digital assistant (PDA) that can include a radiotelephone, etc. In another implementation, user device 110 may include any type of mobile computer device or system, such as a personal computer (PC), a laptop, a tablet computer, a notebook, a netbook, a media or game-playing device, etc., that may include communication functionality.

User device 110 may connect to network 130 and other devices in network 100 (e.g., transaction device 120) via any conventional technique, such as wired, wireless, or optical connections. For simplicity, user device 110 and the person associated with user device 110 (e.g., the party holding or using user device 110) may be referred to collectively as user device 110 in the description below.

Transaction device 120 may represent one or more computing devices and/or servers that participate in a transaction, such as a purchase of goods or services by user device 110 from a merchant or other entity associated with transaction device 120. For example, transaction device 120 may include an electronic cash register or point-of-sale system at a retail location or another device/system that is able to receive payment information and/or other information from user device 110. In an exemplary implementation, transaction device 120 may communicate with user device 110 via wired or wireless mechanisms when a transaction is taking place, as well as communicate with user device 110 to prompt the user for additional payment authorization after the initial transaction is completed, as described in detail below.

Network 130 may include one or more wired, wireless and/or optical networks that are capable of receiving and transmitting data, voice and/or video signals. For example, network 130 may include one or more public switched telephone networks (PSTNs) or other type of switched network. Network 130 may also include one or more wireless networks and may include a number of transmission towers for receiving wireless signals and forwarding the wireless signals toward the intended destination. Network 130 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100, may include thousands of user devices 110 and transaction devices 120 via which transactions may be made. In addition, network 100 may include other devices/systems that aid in conducting transactions in network 100. For example, network 100 may include one or more entities associated with approving a transaction between user device 110 and transaction device 120, such as a credit or debit card company processing system that determines whether the party associated with user device 110 has adequate funds to purchase a particular item. Further, network 100 may include additional elements, such as switches, gateways, routers, etc., that aid in routing data.

In addition, various functions are described below as being performed by particular components in network 100. In other implementations, various functions described as being performed by one device may be performed by another device or multiple other devices, and/or various functions described as being performed by multiple devices may be combined and performed by a single device.

Figure 2:
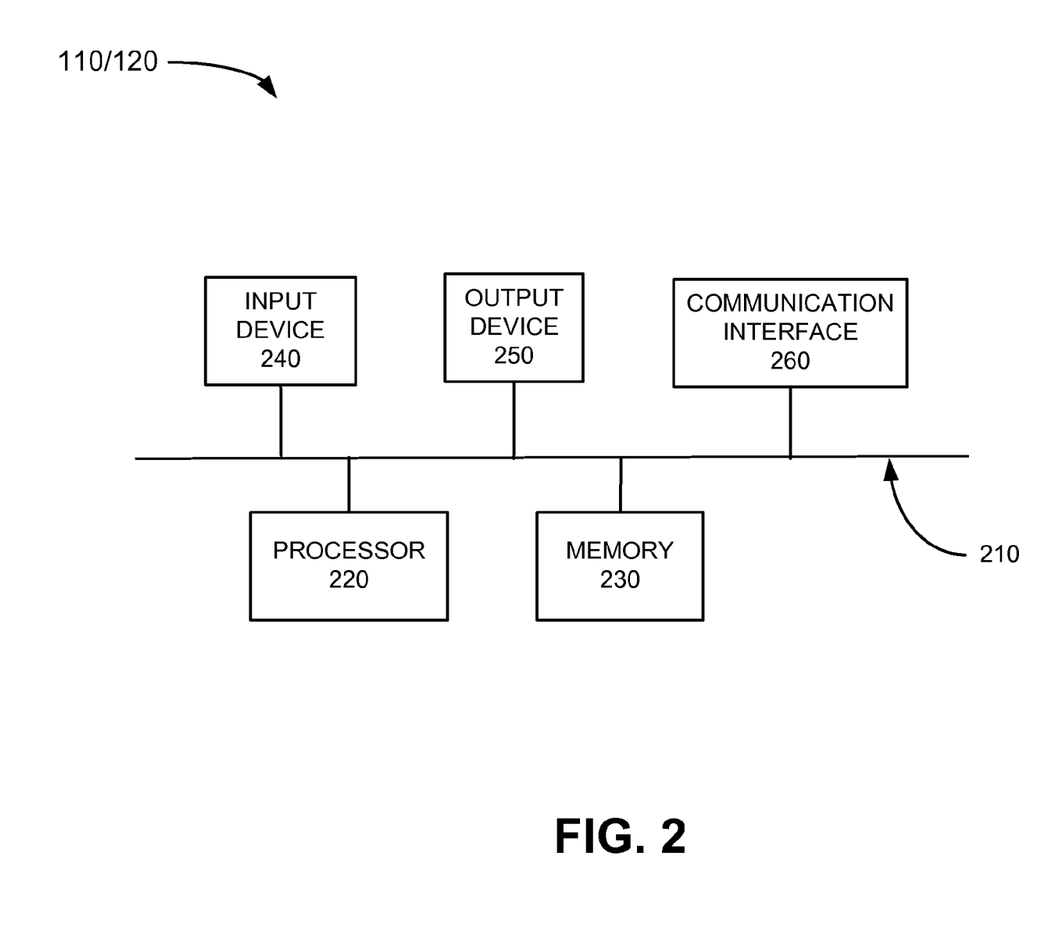
FIG. 2 illustrates an exemplary configuration of components implemented in one or more of the devices of FIG. 1.

FIG. 2 is a diagram illustrating components of user device 110 according to an exemplary implementation. Transaction device 120 may be configured in a similar manner. User device 110 (or transaction device 120) may include bus 210, processor 220, memory 230, input device 240, output device 250 and communication interface 260. Bus 210 permits communication among the components of user device 110. One skilled in the art would recognize that user device 110/transaction device 120 may be configured in a number of other ways and may include other or different elements. For example, user device 110/transaction device 120 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 110.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; a hard disk drive (HDD); and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 110, such as a microphone, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, a stylus, voice recognition and/or biometric mechanisms, etc. Output device 250 may include one or more mechanisms that output information to the user, such as a display, a printer, one or more speakers, etc. In an exemplary implementation, user device 110 may include a touch screen display (e.g., a liquid crystal display (LCD)) that functions as both an input device and an output device.

Communication interface 260 may include one or more transceivers that enable user device 110 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers and one or more antennas for transmitting and receiving RF data via a network.

In an exemplary implementation, communication interface 260 includes a near field communication (NFC) interface/system that allows user device 110 to communicate with transaction device 120 (or other devices) when user device 110 is in close proximity to transaction device 120. For example, an NFC system may include a short range, high frequency system that enables the short range exchange of data with another device (e.g., transaction device 120) that includes a similar NFC interface/system. For example, in one implementation, an NFC interface/system in user device 110 may communicate with a similar NFC interface/system in transaction device 120 when user device 110 is located a distance ranging from 0 to 20 centimeters (cm) from transaction device 120.

User device 110 may provide a platform for a user to make payments via a secure link established between user device 110 and a payment processor, as well as receive communications (e.g., telephone calls, electronic mail, text messages, multi-media messages, short message service (SMS) messages, etc.) regarding follow up payments. Transaction device 120 may provide a platform for a retailer or service provider to receive payment information via the secure link established between transaction device 120 and user device 110, as well as transmit communications (e.g., telephone calls, electronic mail, text messages, multi-media messages, short message service (SMS) messages, etc.) to user device 110 regarding follow up payments.

User device 110 and transaction device 120 may perform these operations in response to their respective processors 220 executing sequences of instructions contained in a computer-readable medium, such as memory 230. Such instructions may be read into memory 230 from another computer-readable medium via, for example, communication interface 260. In alternative embodiments, hard-wired circuitry may be used in place of or in combination with software instructions to implement processes consistent with the invention. Thus, implementations described herein are not limited to any specific combination of hardware circuitry and software.

Figure 3:
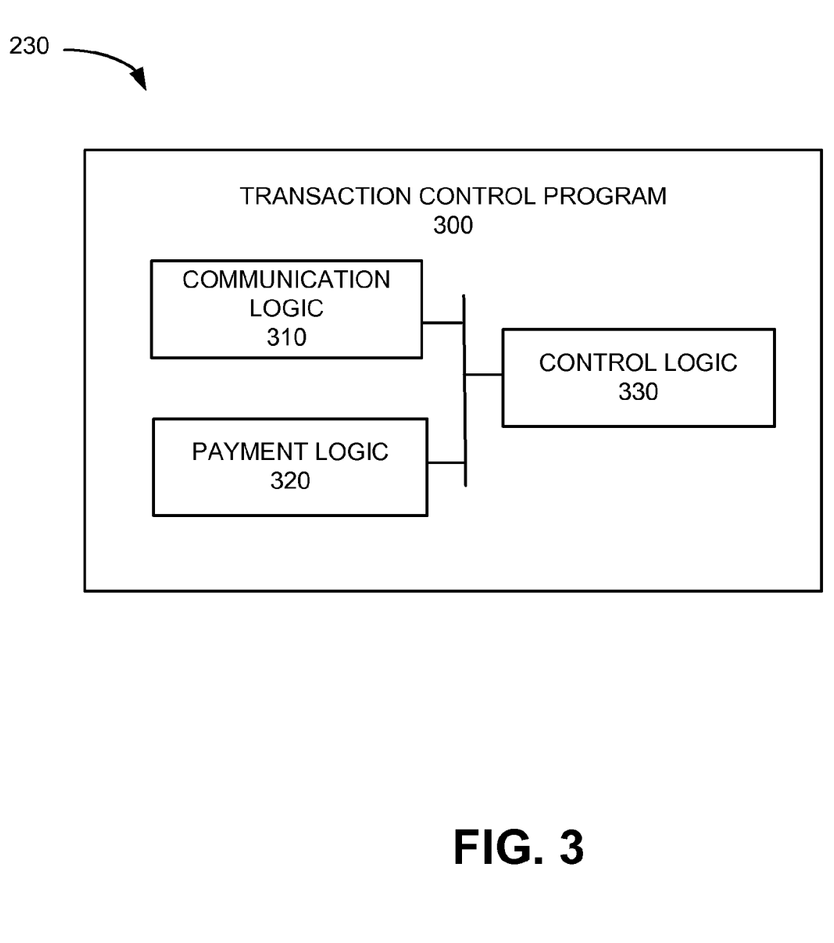
FIG. 3 illustrates an exemplary configuration of logic components implemented by one of the devices of FIG. 1.

FIG. 3 is an exemplary block diagram of components implemented in transaction device 120 of FIG. 2. In an exemplary implementation, some or all of the components illustrated in FIG. 3 may be stored in memory 230 of transaction device 120 and may be executed by processor 220. For example, memory 230 of transaction device 120 may store a transaction control program 300 executed by processor 220.

Transaction control program 300 may include communication logic 310, payment logic 320 and control logic 330. Transaction control program 300 and its various logic components are shown in FIG. 3 as being included in transaction device 120. In alternative implementations, these components or a portion of these components may be located externally with respect to transaction device 120, such as on a server device accessible via network 130.

Communication logic 310 may include logic for communicating with other devices in network 100. For example, communication logic 310 may transmit and/or receive information to/from user device 110 via wired or wireless mechanisms. In one implementation, communication logic 310 may include an NFC interface that communicates with an NFC interface in user device 110.

Payment logic 320 may include logic to receive payment authorization information and determine whether to provide the particular good or service. For example, payment logic 320 may signal an external device/system to determine whether the customer associated with user device 110 has adequate funds or credit in his/her account to pay for the product or service that he/she wishes to purchase. In this manner, payment logic 320 may allow transaction device 120 to operate as a point-of-sale terminal for conducting transactions.

Control logic 330 may include logic to control operation of transaction control program 300. For example, control logic 330 may determine whether a subsequent payment may be required after an initial payment has been received. As one example, transaction device 120 may be associated with receiving payments for parking at a parking lot or garage. In this case, control logic 330 may determine that the customer's parking time is about to expire (e.g., a parking meter is about to expire) and may generate a communication to send to user device 110 inquiring or prompting the user to pay for additional parking time prior to expiration of the parking time/meter, as described in more detail below.

Figure 4:
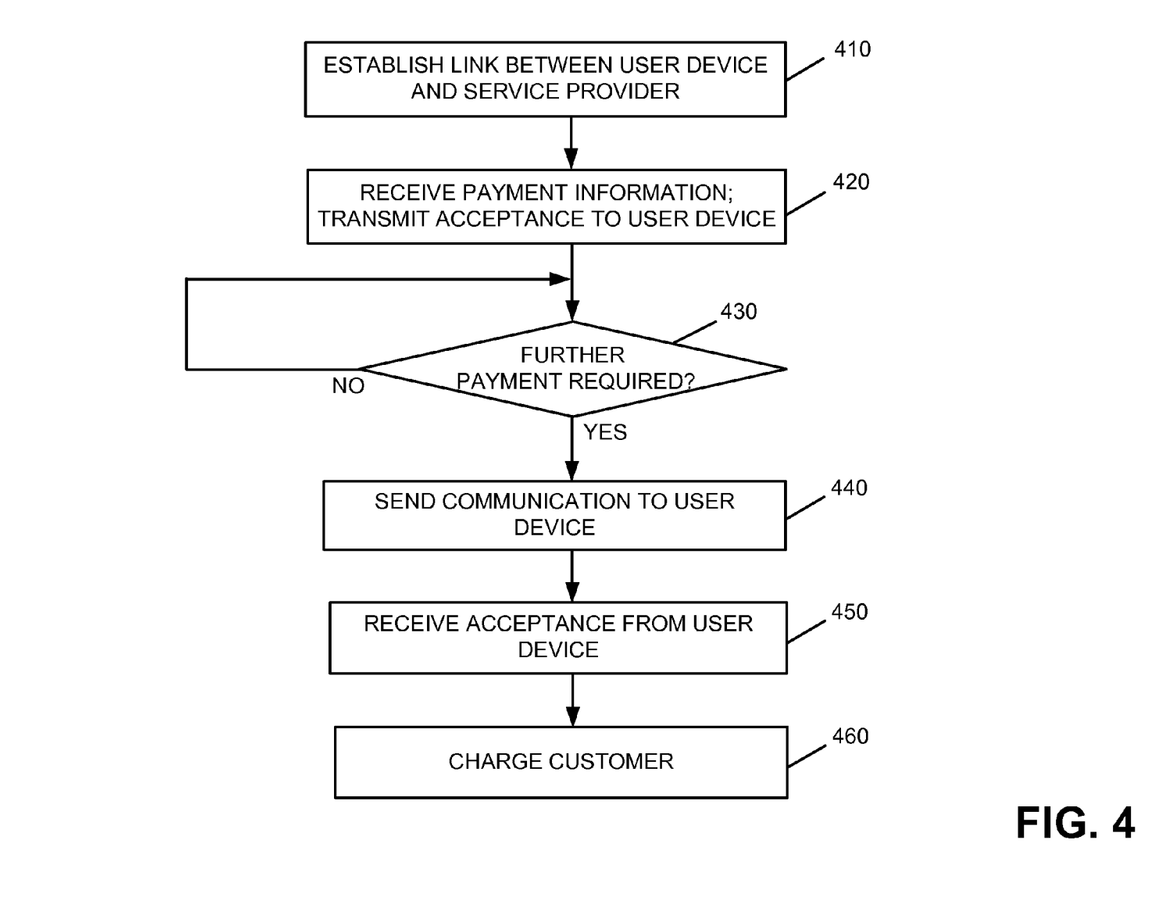
FIG. 4 is a flow diagram illustrating exemplary processing associated with the network of FIG. 1.

FIG. 4 illustrates exemplary processing associated with processing a transaction in network 100. Processing may begin with a party associated with user device 110 (also referred to herein as a customer) interacting with transaction device 120 to initiate a transaction. For example, the customer may wish to make a purchase or pay for a service associated with transaction device 120 via user device 110.

In this example, assume that transaction device 120 is associated with a parking lot or parking garage in which customers may pay for parking electronically by interacting with transaction device 120. For example, transaction device 120 may be included within a kiosk located at an entrance to a parking lot/garage, may be included within a parking meter, etc. Continuing with this example, communication logic 310 of transaction control program 300 may include an NFC interface that is able to form a link with user device 110 that includes an NFC interface. In this case, assume that user device 110 is a cell phone that is moved in close proximity with transaction device 120 and that communication interface 260 of user device 110 establishes a link with communication logic 310 (e.g., an NFC interface) of transaction control program 300 (block 410).

For example, the customer may place user device 110 in proximity to transaction device 120, such as place user device 110 at a distance ranging from 1-20 centimeters (cm) from transaction device 120. In some instances, the link may be established when user device 110 physically contacts transaction device 120. In any event, when user device 110 is placed in a predetermined proximity to transaction device 120, communication logic 310 may detect user device 110 and send a communication to user device 110 requesting that the customer enter an identifier, such as the license number, car registration number, etc., along with a desired time period for which the customer would like to park. User device 110 may receive the communication and display the communication via output device 250 (e.g., an LCD of user device 110).

The customer may provide the desired information and user device 110 may transmit the information to transaction device 120 via the NFC link. Communication logic 310 of transaction device 120 may receive the customer's information. In some implementations, communication logic 310 may automatically detect or identify a telephone number of user device 110 or other communication-related information stored on user device (e.g., a customer's email address). In each case, payment logic 320 of transaction control program 300 may calculate a charge for the desired parking time. Transaction device 120 may communicate the calculated charge to user device 110 via the NFC link and request authorization for charging the customer the calculated fee. User device 110 may receive the communication and output the information for display via output device 250 (e.g., an LCD).

In this case, assume that the user approves the fee and transmits an authorization to transaction device 120 for the parking fee. In some implementations, user device 110 may also transmit his/her credit card information to transaction device 120 via the NFC link established between user device 110 and transaction device 120. In each case, assume that transaction device 120 receives the payment authorization (block 420). Payment logic 320 in transaction control program 300 may communicate with a payment server (not shown in FIG. 1) to determine whether the user has adequate funds/credit for the transaction. In this case, assume that the transaction is accepted (e.g., adequate funds for the transaction exist). Transaction device 120 may communicate the acceptance via the NFC link to user device 110 (block 420).

Subsequent in time to the initial transaction, transaction control program 300 may determine whether any further payment is required (block 430). For example, continuing with the example above, assume that the customer has purchased two hours of parking time from transaction device 120. Further assume that one hour and 50 minutes have elapsed since the user paid for parking. In some embodiments, control logic 330 may also determine that the customer's car is still parked in the lot or garage. For example, transaction device 120 may receive an indication when the customer's car has exited the parking lot/garage/space via, for example, an input associated with a parking ticket used to exit the parking lot/garage, via a presence indicator associated with camera located at the parking meter/parking space that determines whether the customer's car is still parked, etc.

In any event, assume that control logic 330 determines that the customer's car is still parked in the lot/garage/space. Further assume that control logic 330 determines that the customer's parking time will expire in ten minutes and that further payment is required (block 430—yes). Control logic 330 may then transmit a communication to user device 110 to indicate that a further payment is required (block 440).

For example, control logic 330 may transmit a text-based message, such as a short message service (SMS) message, to user device 110 to indicate that the user's parking time/meter will expire in 10 minutes. The SMS message may also inquire whether the user would like to pay for more parking time (e.g., another hour or more). User device 110 may receive the text message and output device 250 may output the message for display.

Figure 5:
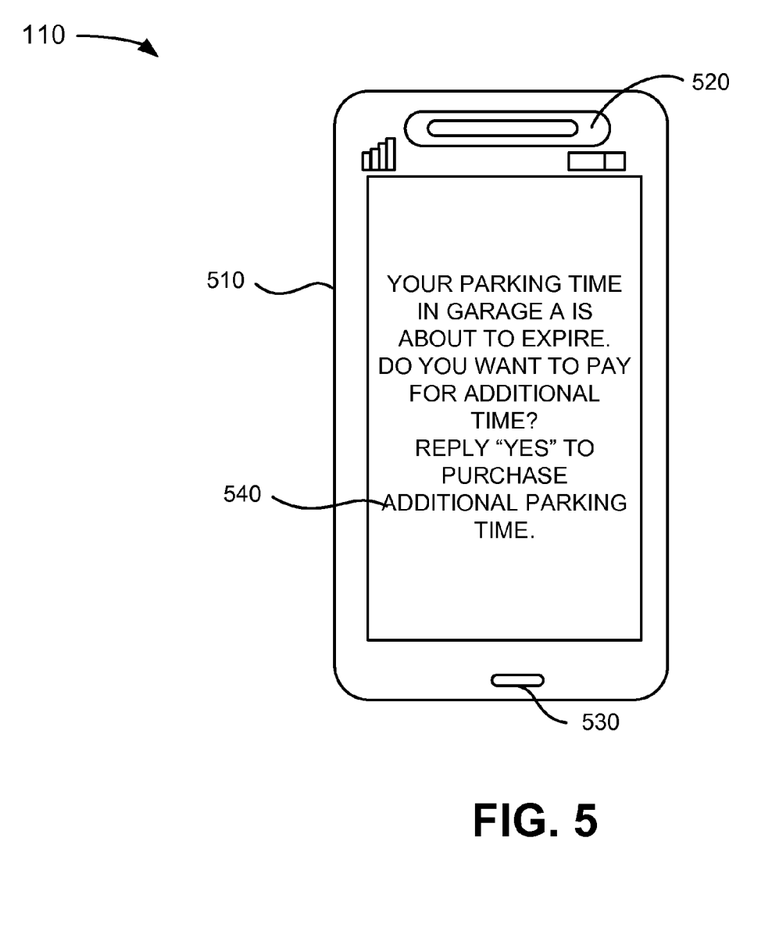
FIG. 5 is a diagram illustrating an exemplary message provided to the user device of FIG. 1 in accordance with an exemplary implementation.

For example, FIG. 5 illustrates user device 110 with a displayed message. In this implementation, user device 110 is a cellular telephone that includes a housing 510, a speaker 520, a microphone 530 and a display 540. Housing 510 may protect the components of user device 110 from outside elements. Speaker 520 may provide audible information to a user of user device 110. Microphone 530 may receive audible information from the user of user device 100. Display 540 may provide visual information to the user.

For example, referring to FIG. 5, display 540 may output a text message transmitted from transaction device 120 that states "Your parking time in Garage A is about to expire. Do you want to pay for additional time?"

The customer may view the message and provide a response. For example, the customer may send a return text message (e.g., an SMS message) to transaction device 120 indicating that he/she would like to pay for additional parking time. In some implementations, transaction device 120 may further inquire as to the duration of the additional time that the customer would like to pay for. In this case, transaction device 120 may provide an additional message to user device 110 prompting the customer to enter a particular duration (e.g., one hour), and provide a cost associated with each incremental duration of time (e.g., $3.00/hour).

In this example, assume that transaction device 120 receives acceptance and authorization from user device 110 to purchase additional parking time (block 450). Payment logic 320 at transaction control program 300 may then charge the appropriate fee to the previously provided account information (block 460). For example, in one implementation, payment logic 320 may temporarily store payment information (e.g., a credit or debit card number of the customer) communicated to transaction device 120 from user device 110 at the time of the initial purchase (e.g., via the NFC link). As a result, when the customer authorizes the additional payment, transaction device 120 does not have to request any private information (e.g., credit or debit card information) that would have to be transmitted over an unsecured network. In this manner, further payments may be processed using the previously stored information and provide enhanced security to the customer. In addition, the temporarily stored payment information in transaction device 120 may be deleted after a predetermined period of time.

The particular duration of time in which the payment information is stored in transaction device 120 may be determined based on the type of transaction. For example, for a parking lot, the customer's payment information may be saved for a period ranging from two to eight hours. In other instances, the customer at user device 110 may communicate with transaction device 110 to set the particular duration of time.

In this manner, a customer may establish communications with transaction device 110 over a secure link (e.g., an NFC link) and provide payment information via the secure link. Subsequently, transaction device 120 may prompt the customer for future payments without having to request private customer information.

As another example, transaction device 120 may be associated with providing pay-per-view programming output to a television or computer in the customer's home, hotel room, etc. In this case, when the customer wishes to watch a movie, sports event, television show that requires payment of a fee, the customer may bring user device 110 into close proximity (e.g., 1-20 cm) of transaction device 120, which may be a set top box or other device used to control programming, to initiate payment via the NFC link. After the payment information is transmitted to transaction device 120, the customer may watch the pay-per-view program.

At the end of the program, control logic 330 of transaction control program 300 may identify other programming that may be associated with the first program that the customer may be interested in viewing. For example, control logic 330 may identify another movie, such as a sequel to the first movie, the next episode of the television series, etc. Control logic 330 may then send a communication (e.g., an SMS or email message) to user device 120 inquiring whether the customer would like to order the identified program. The communication to user device 120 may also provide a charge for the subsequent program. Control logic 330 may transmit, via communication logic 310, the communication to user device 110. User device 110 may receive the communication and output the communication to display 540.

The customer may simply respond to the message via user device 110 and receive the next program, without having to get up and move in proximity to transaction device 120 to provide the response. Similar to the example above, if the customer provides an affirmative response (e.g., orders the next program), transaction device 120 may charge the customer using the previously supplied user information (e.g., credit or debit card) that may be temporarily stored in transaction device 120.

As still another example, in some implementations, transaction device 120 may be associated with a vending machine at which a customer may purchase a song, album, electronic book (ebook), movie, etc., that may be downloaded to user device 110. In this case, the customer at user device 110 may establish a link (e.g., an NFC link) with transaction device 120 to purchase, for example, a movie. Transaction device 120 may download the movie to user device 110.

Assume that after the customer has received and paid for the movie, the customer watches the movie via user device 110 (e.g., while on a train, at home, etc.) After a predetermined period of time (e.g., two hours), control logic 330 may send a communication to user device 110 inquiring whether the user would like to purchase an additional movie, song, ebook, etc. The predetermined period of time may be based on the duration of the media purchased. For example, if the customer purchased a movie that is two hours in duration, transaction device 120 may send the follow up communication to user device 110 at approximately 2½ hours from the first purchase. In contrast, if the customer purchased an album that is 60 minutes in duration, transaction device 120 may send the communication at approximately 75 minutes from the first purchase. In each case, the customer may simply respond to the communication and if he/she responds affirmatively, transaction device 120 may download or stream the purchased content to user device 110 via, for example, network 130. Transaction device 120 may then charge the customer for the purchase content, without requiring the user to provide any confidential information (e.g., credit or debit card information).

In the implementations described above, an initial transfer of information between user device 110 and transaction device 120 is described as being implemented via NFC. In other implementations, the initial transfer of information between user device 110 and transaction device 120 may be accomplished via other wireless mechanisms or protocols, such as Bluetooth, radio frequency identification (RFID), etc. In addition, in some implementations, the initial wireless transfer of information may include other security protocols or mechanisms to enhance the security of the initial transaction. In still other implementations, the initial transfer of information may be provided via wired mechanisms. For example, the customer at user device 110 may physically connect user device 110 to transaction device 120 via, for example, a universal serial bus (USB) interface to exchange information (e.g., payment information) with transaction device 120.

In any of these implementations, the initial transaction is conducted in a secure manner, while subsequent communications/transactions may occur via less secure mechanisms. For example, in the implementations described above, the first transaction was conducted via a close coupling of user device 110 and transaction device 120. As a result of the close coupling and low power associated with the transmission of information between user device 110 and transaction device 120, the initial transaction is secure. That is, the confidential information may not be easily intercepted by another party. The subsequent communications between transaction device 120 and user device 110, however, may occur over a conventional network (e.g., network 130) without requiring additional security measures.

In addition, the subsequent communications from transaction device 120 to user device 110 have been described above as being text-based communications, such as SMS messages. In other implementations, transaction device 120 may transmit an email message to user device 110 or other types of text based messages (e.g., a page). In still other implementations, transaction device 120 may place a telephone call placed to user device 110. In such implementations, transaction device 120 may generate an audio message inquiring whether the customer would like to make an additional purchase, pay for additional time, etc.

In any of these implementations, a transaction may be initiated via a secure method (e.g., a secure link) and subsequent or follow up communication may be made without requiring the same level of security, such as in situations where user device 110 is no longer located proximate to transaction device 120. In these cases, the customer may simply provide an affirmative response to purchase an additional product or service.

CONCLUSION

Implementations described herein allow a user device to communicate with a transaction device in a secure manner when making an initial purchase. Subsequently, the transaction device may provide follow up prompts or messages associated with an additional purchase and the customer may simply approve or decline the subsequent purchase. This may provide convenience and enhanced security with respect to making purchases.

The foregoing description of the embodiments described herein provides illustration and description, but is not intended to be exhaustive or to limit the invention to the precise form disclosed. Modifications and variations are possible in light of the above teachings or may be acquired from the practice of the invention.

For example, aspects have been mainly described above with respect to conducting transactions in which an initial purchase/transaction is accomplished via a close coupling of user device 110 and transaction device 120. In other implementations, a customer may have an account with transaction device 120 and the initial purchase authorization may be accomplished via communications, such as an SMS message, an email message, etc. For example, user device 110 may communicate with transaction device 110 via SMS or email to authorize the initial transaction. As one example, user device 110 may transmit a communication to a transaction device 120 associated with a parking lot/garage to authorize charging the customer a fee for parking in the lot/garage. In this case, the subsequent or follow up communications from transaction device 120 may also be transmitted using SMS, email, etc., to user device 110.

In addition, in some implementations, user device 110 may include an application that is associated with a service provider operating transaction device 120. In this implementation, the application on user device 110 may receive notifications from transaction device 120 and may provide an interface (e.g., a graphical user interface) for responding to such notifications. In such implementations, the customer's private information (e.g., credit or debit card information) may not have to be provided to transaction device 120 for initiating a transaction as that information may be previously provided to transaction device 120 via secure communications between the application on user device 110 and transaction device 120.

In addition, although not described above, in some implementations, transaction device 120 may charge user device 110 a premium for sending the subsequent or follow up communications. For example, the customer may be charged a small fee (e.g., less than $1) in addition to the fee for the product or service so that he/she will be alerted via a follow up communication, such as a communication indicating that his/her parking time is about to expire.

Still further, only a few examples have been described above. It should be understood that features described above could be used in other implementations or scenarios. For example, transaction device 120 could be associated with a movie rental store or a library in which customers purchase or borrow various media. In such implementations, transaction device 120 may be used to communicate reminders to a customer that his/her movie or book is overdue, and optionally charge the customer for the additional time in which the media is in the possession of the customer. In some instances, such as when transaction device 120 is associated with a library, the initial transaction (e.g., borrowing a book) may not involve a charge.

In addition, while series of acts have been described with respect to FIG. 4, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

What is claimed is:

1. A method, comprising:
   establishing a communication link between a transaction device and a mobile device located proximate to the transaction device, wherein the transaction device is associated with an entity providing a first good or service;
   receiving, by the transaction device, authorization from the mobile device for a first payment for the first good or service;
   transmitting, by the transaction device, a communication to the mobile device subsequent to receiving the authorization from the mobile device, wherein when the communication is transmitted, the mobile device is not located proximate to the transaction device;
   receiving, by the transaction device, authorization from the mobile device for a second payment in response to the communication;
   identifying, by the transaction device, a second good or service, wherein the second good or service is different than the first good or service, and
   wherein the transmitting comprises:
      transmitting the communication to the mobile device at a predetermined time after receiving the authorization for the first payment and based on a duration associated with the first good or service, in response to identifying the second good or service,
   wherein the first good or service comprises parking time for a user's vehicle parked at a parking lot or garage, the method further comprising:
   determining, by the transaction device, whether the first payment is associated with an expiration time;
   determining whether the user's vehicle is parked at the parking lot or garage at the predetermined time; and
   generating the communication in response to determining that the first payment is associated with the expiration time and that the user's vehicle is parked at the parking lot or garage at the predetermined time, and
   wherein the transmitting the communication comprises:
      transmitting the generated communication prior to the expiration time, the method further comprising:
   establishing a second communication link between the mobile device and a second transaction device located proximate to the mobile device, wherein the second transaction device is associated with an entity providing a third good or service;
   receiving, by the second transaction device, authorization from the mobile device for a third payment for the third good or service;
   transmitting, by the second transaction device, a second communication to the mobile device subsequent to receiving the authorization from the mobile device, wherein when the second communication is transmitted, the mobile device is not located proximate to the second transaction device;

identifying, by the second transaction device, a fourth good or service, wherein the fourth good or service is different than the third good or service; and receiving, by the second transaction device, authorization from the mobile device for a fourth payment in response to the second communication, wherein the transmitting a second communication comprises:

transmitting the second communication to the mobile device at a second predetermined time after receiving the authorization for the third payment and based on a duration associated with the third good or service, in response to identifying the fourth good or service, wherein the third good or service comprises first media content and the second predetermined time corresponds to at least an amount of time associated with a duration of viewing or playing all of the first media content associated with the third payment.

2. The method of claim 1, wherein the establishing the communication link comprises establishing a near field communication link.

3. The method of claim 1, wherein the transmitting the communication comprises:

transmitting a text-based message to the mobile device.

4. The method of claim 3, wherein the text based message comprises at least one of a short message service message or an electronic mail message.

5. The method of claim 1, wherein the transmitting the communication comprises:

transmitting an audio message to the mobile device.

6. The method of claim 1, further comprising:

identifying, by the transaction device, a telephone number or electronic mail address associated with the mobile device, wherein the transmitting comprises:

transmitting the communication to the identified telephone number or electronic mail address.

7. The method of claim 1, wherein the mobile device comprises a cellular telephone.

8. A system, comprising:

a communication interface configured to communicate with a mobile device; and processing logic configured to:

receive authorization from the mobile device, when the mobile device is located proximate to the system, for a first payment for a first good or service, transmit a communication to the mobile device subsequent to receiving the authorization from the mobile device, wherein when the communication is transmitted, the mobile device is not located proximate to the system, receive authorization from the mobile device for a second payment in response to the communication, and identify a second good or service which is different than the first good or service, and when transmitting a communication, the processing logic is configured to:

transmit the communication to the mobile device at a predetermined time after receiving the authorization for the first payment and based on a duration associated with the first good or service, wherein the communication identifies the second good or service, wherein the first good or service comprises parking time for a user's vehicle parked at a parking lot or garage, wherein the processing logic is further configured to:

determine whether the first payment is associated with an expiration time, determine whether the user's vehicle is parked at the parking lot or garage at the predetermined time, and generate the communication in response to determining that the first payment is associated with the expiration time and that the user's vehicle is parked at the parking lot or garage at the predetermined time, wherein when transmitting the communication, the processing logic is configured to:

transmit the generated communication prior to the expiration time, and wherein the processing logic is further configured to:

transmit a second communication to the mobile device at a second predetermined time after receiving authorization for a third payment for a third good or service and based on a duration associated with the third good or service, the second communication identifying a fourth good or service, wherein the third good or service comprises media content and the fourth good or service comprises different media content.

9. The system of claim 8, wherein the communication interface comprises a near field communication interface.

10. The system of claim 8, wherein the processing logic is further configured to:

generate a text-based communication based on at least one of the first good or service, or a time associated with the first good or service, and wherein when transmitting the communication, the processing logic is configured to:

transmit the text-based communication to the mobile device.

11. The system of claim 10, wherein the text based message comprises at least one of a short message service message or an electronic mail message.

12. The system of claim 8, wherein when transmitting the communication, the processing logic is configured to:

transmit an audio message to the mobile device.

13. The system of claim 8, wherein the processing logic is further configured to:

generate the communication in response to determining that the first payment is associated with an expiration time, and wherein when transmitting the communication, the processing logic is configured to:

transmit the generated communication prior to the expiration time.

14. The system of claim 8, wherein the processing logic is further configured to:

automatically identify a telephone number or electronic mail address associated with the mobile device, when the mobile device is located proximate to the system, and when transmitting, the processing logic is configured to:

transmit the communication to the identified telephone number or electronic mail address.

15. The system of claim 8, further comprising:

a memory configured to temporarily store billing information associated with an account of a user of the mobile device, and wherein the processing logic is further configured to:

use the billing information to determine whether to provide the first good or service, and delete the stored billing information after a predetermined amount of time based the first good or service.

16. The method of claim 1, wherein the third good or service comprises a first pay-per view program and the fourth good or service comprises a second pay-per view program.

\* \* \* \* \*